(12) United States Patent
Rathje et al.

(10) Patent No.: US 7,603,014 B2
(45) Date of Patent: Oct. 13, 2009

(54) METHOD FOR THE MANUFACTURE OF OPTICAL FIBERS AND IMPROVED OPTICAL FIBERS

(75) Inventors: Jacob Rathje, Fredericksburg (DK); Lars Grüner-Nielsen, Bronshoj (DK)

(73) Assignee: Furukawa Electric North America, Norcross, GA (US)

( * ) Notice: Subject to any disclaimer, the term of this patent is extended or adjusted under 35 U.S.C. 154(b) by 45 days.

(21) Appl. No.: 11/980,123

(22) Filed: Oct. 30, 2007

(65) Prior Publication Data
US 2008/0063347 A1  Mar. 13, 2008

Related U.S. Application Data

(62) Division of application No. 10/426,193, filed on Apr. 30, 2003, now abandoned.

(51) Int. Cl.
*G02B 6/02* (2006.01)
(52) U.S. Cl. .......................... 385/127; 385/24; 385/123; 385/124; 385/125; 385/126

(58) Field of Classification Search .................... 385/24, 385/123–127
See application file for complete search history.

(56) References Cited

U.S. PATENT DOCUMENTS 6,711,331 B2 * 3/2004 Sasaoka et al. .............. 385/123

* cited by examiner

*Primary Examiner*—Jennifer Doan
(74) *Attorney, Agent, or Firm*—Peter V. D. Wilde

(57) ABSTRACT

The present invention is directed to a universal channel dispersion compensating fiber (CDCF) for WDM channel compensation that provides essentially zero dispersion slope over the wide wavelength band used in state-of-the-art transmission systems. It allows compensation of a large number of channels using a single fiber design. The improved optical fiber of the invention exhibits a dispersion slope at 1550 nm: <0.02 ps/nm2-km, preferably <0.01 ps/nm2-km, and a maximum variation of dispersion per km over the S-, C-, and L-bands of preferably less than 2.0 ps. In a preferred embodiment, the index profile of these fibers comprises a simple three layer design, which includes an up-doped central core, surrounded by a down-doped trench region, further surrounded by an up-doped ring region.

20 Claims, 3 Drawing Sheets

METHOD FOR THE MANUFACTURE OF OPTICAL FIBERS AND IMPROVED OPTICAL FIBERS

RELATED APPLICATION

This application is a Division of application Ser. No. 10/426,193, filed Apr. 30, 2003 now abandoned.

FIELD OF THE INVENTION

This invention relates to optical fiber transmission systems having improved optical transmission characteristics, and in particular, systems using optical fiber with improved dispersion compensation.

BACKGROUND OF THE INVENTION

Optical transmission systems employ Wavelength Division Multiplexing (WDM) to increase information handling of an optical fiber transmission line, typically a long haul transmission line. Early WDM systems operated with a relatively narrow wavelength bandwidth, centered around 1550 nanometers, e.g. 1530-1565 nanometers, referred to as the C-band. This is the wavelength region where standard silica based optical fibers have optimally low absorption.

In most WDM systems there is a trade-off between the number of channels the system accommodates and the channel separation. Higher bit rates generally call for an increase in channel spacing. Both goals favor a wide operating spectrum, i.e. a wide range of operating wavelengths.

Recently, systems have been designed that extend the effective operating wavelength range well above the C-band transmission band. In terms of wavelength, the new band, referred to as the L-band, is variously defined, but for the purpose of this description is 1570-1610 nanometers. Substantial work has also been done in the S-band, defined as 1460-1530 nm. Use of these added wavelengths substantially extends the capacity of WDM systems. There is an ongoing effort to further extend the effective operating wavelength window to above 1610 nm, for example to 1620 nm. Success of these efforts will depend on finding components that provide effective operation over this broad wavelength range.

An important aspect In the design of optical fibers for high bit rate, wide-band, systems, is management of chromatic dispersion. This problem grows significantly as the data bit rate is increased. Chromatic dispersion is the property of optic fiber that causes different colors of light to travel at different speeds and its effect in digital multiwavelength systems can be both positive and negative. When dispersion is severe, optical data pulses traveling over long transmission lengths may overlap. In early systems, efforts were made to reduce dispersion as much as possible. Initial attempts focused on making fibers with very low intrinsic dispersion. As optical transmission systems developed with higher bit rates, efforts shifted to correcting dispersion using dispersion compensating elements, typically lengths of optical fiber with dispersion values equal to and opposite those of the transmission line.

These elements, referred to as Dispersion Compensating Fiber (DCF) are very effective, but add cost to the system. Thus an optical fiber transmission line with high dispersion limits the distance that high bit rate signals can travel without expensive dispersion compensation.

On the other hand, too little dispersion allows adjacent signals to interfere and produce crosstalk.

The ideal long distance fiber has enough dispersion to suppress crosstalk, but small enough dispersion to allow high bit rate signals to travel long distances, and relatively the same amount of dispersion for each wavelength. These fibers, designed with deliberate finite dispersion values, are referred to as non-zero dispersion fibers (NZDF).

However, it is known in state of the art systems having dispersion compensating elements, some residual dispersion exists in the demultiplexed channels. This residual dispersion is easily compensated by a selected channel compensation component that, like the DCF described above, typically is a length of optical fiber having dispersion characteristics designed for the center wavelength of the channel. The dispersion of the channel dispersion compensating fiber (CDCF) is chosen to be equal to, but opposite in sign from, the residual channel dispersion.

STATEMENT OF THE INVENTION

We have designed a universal channel dispersion compensating fiber (CDCF) for WDM channel compensation that provides essentially zero dispersion slope over the wide wavelength band used in state-of-the-art transmission systems. It allows compensation of a large number of channels using a single fiber design. The preferred optical fiber exhibits these nominal characteristics:

Dispersion at 1550 nm: <−20 ps/nm-km, and preferably <−40 ps/nm-km

−0.02 ps/nm$^2$-km<Dispersion slope at 1550 nm: <0.02 ps/nm$^2$-km, −0.01 ps/nm$^2$-km<preferably <0.01 ps/nm$^2$-km Dispersion variation from 1500 nm-1620 nm (per km): <5 ps/nm-km and preferably <2.0 ps/nm-km Cutoff wavelength: <1470 nm Polarization Mode Dispersion (PMD): 0.00-0.06 ps/km$^{0.5}$ Attenuation @ 1550 nm: <0.4 dB/km A variety of optical fiber refractive index profiles that produce these transmission characteristics may be designed. In prior art designs, these have a complex profile comprising six or more layers. The profile design of this invention is a simple four layer design comprising an up-doped central core (usually referred to as the core), surrounded by a down-doped region (usually referred to as the trench), further surrounded by an up-doped region (referred to as the ring), further surrounded by an essentially undoped cladding. A similar basic profile (but with different performance characteristics) is described and claimed in U.S. Pat. Nos. 5,878,182, and 5,905, 838, which are incorporated herein by reference. In advanced DCF designs, the profile of the invention may also have a second down-doped trench, with a width of, for example, 2-10 microns, added either just outside the ring, or farther out in the cladding, in order to adjust the cutoff wavelength, and reduce microbending loss.

The inventive features may be more easily followed with the aid of the drawing:

DETAILED DESCRIPTION

Figure 1:
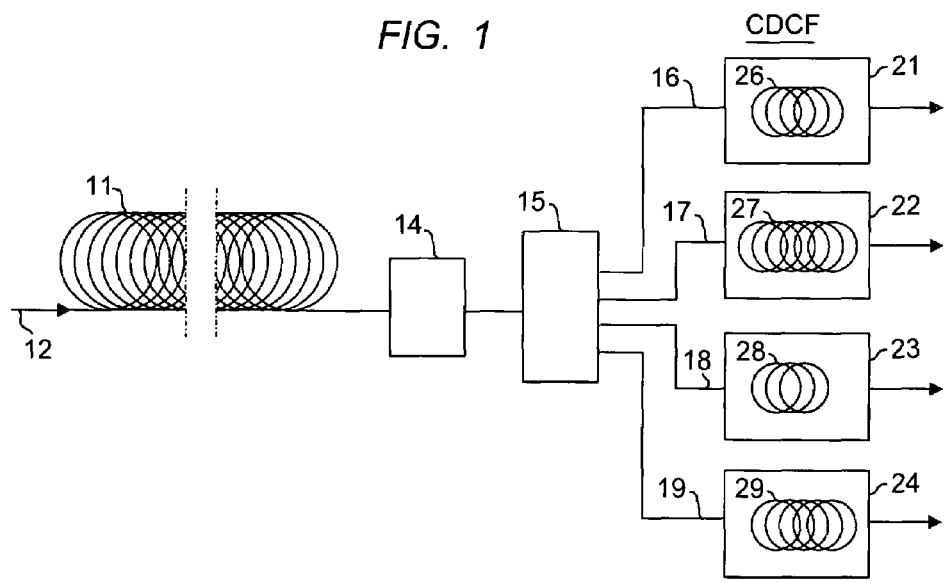
FIG. 1 is a simplified diagram of an optical communications system showing a transmission line, demultiplexer system, and dispersion compensating elements.

A long haul transmission system, with dispersion compensating and demultiplexing elements, is shown schematically in FIG. 1. Here the long length of transmission fiber is shown at 11, with input signal at 12. The transmission fiber 11 may be tens of kilometers in length. The input signal is a multiplexed signal, typically with at least 4 signal bands. In state-of-the-art systems, the input signal operates at 10 Gb or more, and has 8 or more channels, more typically 40 or more channels. In FIG. 1, the element that performs the transmission line compensation is represented by box 14. This element is typically installed in-line and may operate on the entire bandwidth of the multiplexed signal. In systems where the bandwidth is very wide, for example, in systems covering at least portions of the S-, C- and L-bands, the overall signal may be split into two or more bands, and a separate DCF is used for each of the split bands.

The dispersion compensated signal then arrives at the demultiplexer 15, which separates the signal into separate channels. In the illustration of FIG. 1, the multiplexed signal is separated into 4 channels 16, 17, 18, and 19, as shown. Each of the channel signals then pass through the CDCF stage, where channel dispersion elements 21-24 compensate the residual dispersion in each of the channel signals 16-19. The CDCF in each of the compensating elements 21-24 comprises a length of fiber that is adjusted to provide the dispersion compensation needed. Thus the optical fibers shown at 26-29 have different lengths, depending on the amount of dispersion in each given signal.

Using conventional dispersion compensating fiber, there are two important variables that determine the selection of the CDCFs 26-29. In conventional dispersion compensating fiber, the dispersion value varies with the wavelength of the signal. Therefore in designing the CDCF, the total dispersion needed for compensation, in ps/nm, is divided into the dispersion value of the fiber at the signal wavelength in ps/nm/km to yield the length of CDCF needed for the compensating elements. The correct length for each channel will vary with both the channel wavelength and the residual channel dispersion. In addition, if the dispersion slope of the CDCF is high at a given wavelength, different lengths of the CDCF are needed to compensate for the same residual dispersion at different channels. Typically the length of CDCF is wound on a spool. The resulting element is referred to as a Dispersion Compensating Module (DCM). A module of a DCF with dispersion slope different from zero will have a different compensation value at difference channels. This requires an inventory of different DCMs for each of the wavelength bands in the system.

Substantial economy in WDM systems would result if the CDCFs were made with a single design, a design with the same dispersion over the entire bandwidth of the system.

In an optical fiber designed according to the invention, the wavelength variable is essentially eliminated and the effect of dispersion slope is also essentially eliminated. This is achieved in an optical fiber design that has a dispersion slope that is essentially flat over the entire bandwidth of the system. Such a design, according to the invention, has the following characteristics:

Dispersion at 1550 nm: <−20 ps/nm-km, and preferably <−40 ps/nm-km

−0.02 ps/nm$^2$-km<Dispersion slope at 1550 nm: <0.02 ps/nm$^2$-km, −0.01 ps/nm$^2$-km<preferably <0.01 ps/nm$^2$-km Dispersion variation from 1500 nm-1620 nm (per km): <2.0 ps Cutoff wavelength: <1470 nm Polarization Mode Dispersion (PMD): 0.00-0.06 ps/km$^{0.5}$ Attenuation @ 1550 nm: <0.4 dB/km In a dispersion compensating fiber it is desirable to have a relatively high value of negative dispersion. The higher the negative dispersion value in the compensating fiber, the shorter the fiber length required to compensate a given amount of residual dispersion. Therefore it is desirable (but not essential) that the CDCF have a dispersion below −20 ps/nm-km.

A more important parameter, in the context of the invention, is the dispersion slope. To provide a universal optical fiber that is useful for any wavelength over the C-, S-, and L-bands, it is preferred that the dispersion slope be less than 0.02 ps/nm$^2$-km or −0.02 ps/nm$^2$-km, and preferably less than 0.01 ps/nm$^2$-km or −0.01 ps/nm$^2$-km.

Figure 2:
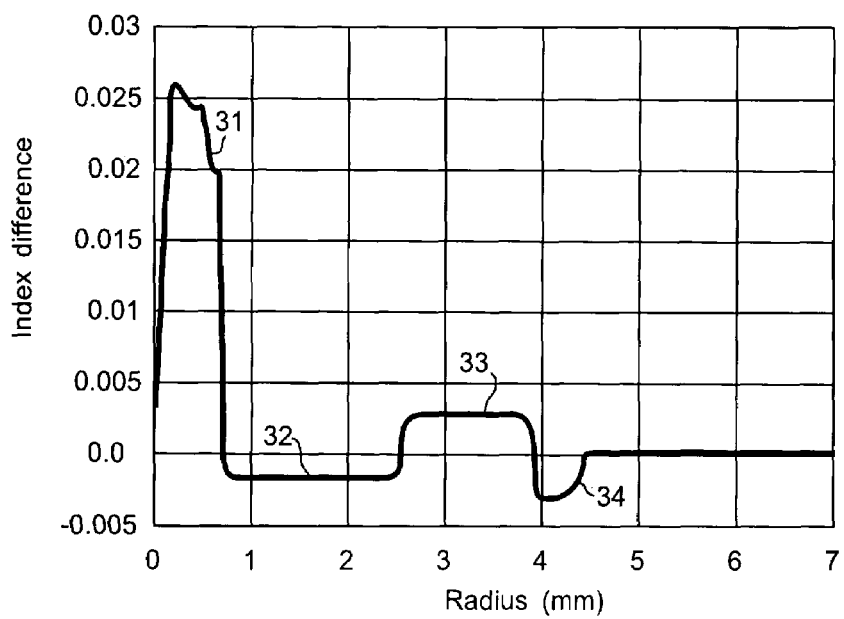
FIG. 2 is a refractive index profile for an optical fiber preform designed for channel dispersion compensating fiber (CDCF) according to the invention.

An optical fiber design meeting these specifications is shown in FIG. 2. The index profile shown is for an optical fiber preform, with the X-axis in mm from the center of the preform. Optical fiber drawn from this preform will have essentially the same profile shape with the X-axis having a scale in microns (different numbers but qualitatively similar). In both cases the four layer design comprises an up-doped central core 31 (usually referred to as the core), surrounded by a down-doped region 32 (usually referred to as the trench), further surrounded by an up-doped region 33 (referred to as the ring). An important feature of the profile shown in FIG. 2 is that it is essentially a four layer design. The second trench, shown at 34, may be added outside the ring, or optionally farther out in the cladding 35, in order to adjust the cutoff wavelength, and reduce microbending loss. This feature may be regarded as optional, and does not influence overall the normal transmission characteristics of the fiber. The optical energy confinement portion of the fiber comprises the three layers 31, 32, and 33. Thus as defined herein the normal optical energy confinement portion of the fiber comprises these three layers, and the fiber is defined as a three layer design. The optical energy confinement region is specified as the "normal" region to represent the predominant length and usual behavior of the optical fiber. It will be recognized by those skilled in the art that the optical fiber profile may contain one or more additional regions to aid in confinement in an unusual mode, for example, in a portion that is bent.

The optical fiber preform shown in FIG. 2 is preferably produced using an MCVD method and the core consequently exhibits a so-called alpha profile, with an index that varies with core radius, and a maxima in the center half of the core (the first half of the core radius measured from the core center). However, optical fibers meeting the performance parameters of the invention, may have any suitable refractive index profile, and may be manufactured by any of a variety of methods, such as for example, Outside Vaper Deposition (OVD), Vapor-phase Axial Deposition (VAD), Plasma-enhanced Chemical Vapor Deposition (PCVD), Plasma Outside Vapor Deposition (POVD), as well as MCVD. Combinations of the above methods may be used for fabricating the various regions of the index profile and overclad regions as appropriate, including the incorporation of soot-on-glass, soot-on-soot, or glass-on-glass interfaces in the preform as appropriate.

With reference again to FIG. 2, the fiber design will be described in more detail. The center core region 31 consists of a raised index region extending from the central axis of the preform to radius a, with the radial variation of the normalized index difference, Δr, described by the equation:

$$\Delta n = \Delta(1-(r/a)^\alpha) - \Delta_{dip}((b-r)/b)^\gamma, \quad r<b$$

$$\Delta n = \Delta(1-(r/a)^\alpha), \quad b<r<a \quad (1)$$

where
r is the radial position,
$\Delta$ is the normalized index difference on axis if $\Delta_{dip}=0$,
a is the core radius,
α is the shape parameter,
$\Delta_{dip}$ is the central dip depth, The parameters $\Delta_{dip}$, b, and γ, i.e. the central dip depth, the central dip width, and the central dip shape, respectively, are artifacts of MCVD production methods, and these factors may be used when MCVD methods are the production choice for the optical fiber preform. When using other preform fabrication techniques, for example VAD, there will be no central dip.

The equation describing the core shape consists of the sum of two terms. The first term generally dominates the overall shape and describes a shape commonly referred to as an alpha profile. The second term describes the shape of a centrally located index depression (depressed relative to the alpha profile). The core region generally consists of silica doped with germanium at concentrations less than 10 wt % at the position of maximum index, and graded with radius to provide the shape described by equation (1).

The trench region is an annular region surrounding the core region with an index of refraction that is less than that of the $SiO_2$ cladding. The index of refraction in this region is typically approximately constant as a function of radius, but is not required to be flat. The trench region generally consists of $SiO_2$, doped with appropriate amounts of fluorine and germania to achieve the desired index of refraction and glass defect levels.

The cladding region is an annular region surrounding the ring, usually consisting of undoped $SiO_2$. However, as mentioned above, internal to the cladding region may also exist an additional region 34 of fluorine doped glass, of the appropriate index level and radial dimensions, to improve bending loss characteristics. The cladding region typically extends to 62.5 μm radius, but may be smaller.

Figure 3:
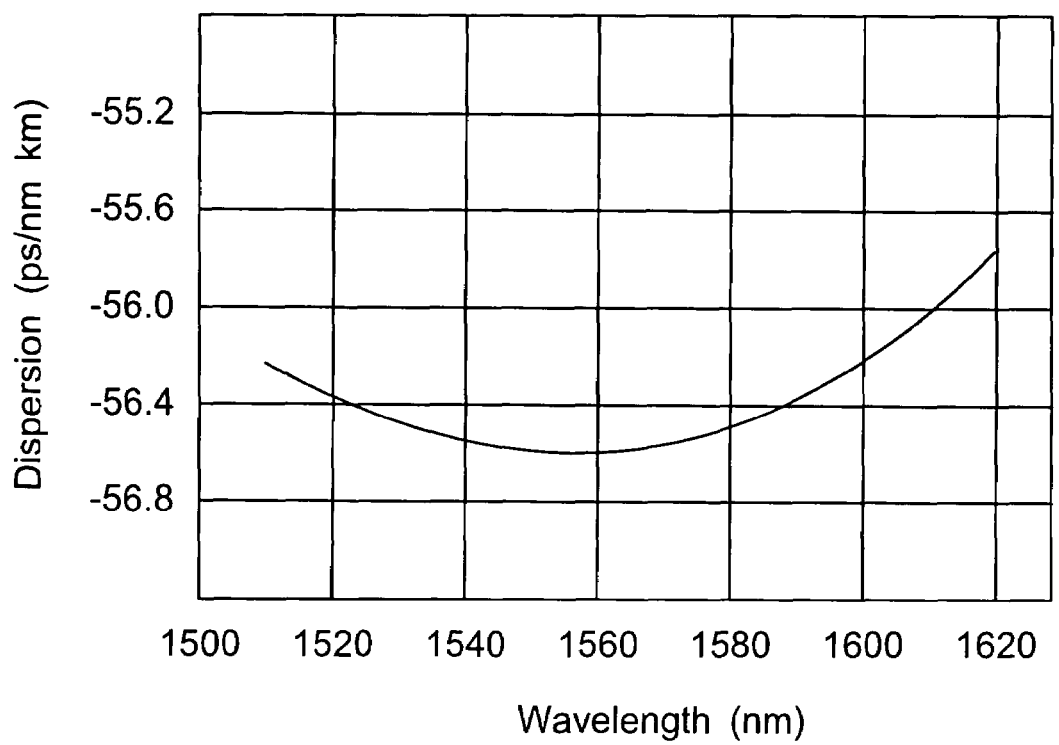
FIG. 3 is a plot of dispersion vs. wavelength for a fiber drawn from the preform represented by the profile of FIG. 2.

A plot of dispersion vs. wavelength for an optical fiber drawn from a preform with the profile shown in FIG. 2 is given in FIG. 3. The Y-axis scale is relatively fine and therefore amplifies the curvature of the dispersion curve. However, it will be appreciated that the dispersion variation over the entire wavelength range of 1510 nm to 1620 nm is exceptionally small, less than 0.9 ps/nm-km. This design is but one of potentially several or many that provide this flat dispersion slope. In general, fiber designs with less than 2.0 ps/nm-km, or even less than 5.0 ps/nm-km, would be suitable. Expressed as dispersion slope, fibers with less than 0.2 ps/nm²/km, and preferably less than 0.1 ps/nm²/km are preferred. Although the plot of FIG. 3 does not extend through the entire S-band, similar dispersion characteristics may be expected at those wavelengths as well. It would be expected that a DWDM system would operate over at least part of the C- and L-bands, which are shown completely in the data.

It should be evident from the discussion above that the particular dispersion vs. wavelength curve of an optical fiber design determines how precisely chromatic dispersion can be compensated, especially in the case of single-mode dispersion compensating fibers. A relevant and useful parameter is the ratio of the dispersion slope to the dispersion at the central wavelength of the signal band (here called the "relative dispersion slope" or RDS). If the RDS of the cabled transmission fiber (typically with positive dispersion) is equal to the RDS of the negative dispersion compensating fiber (typically housed in a module, but can be cabled as well), then precise cancellation of dispersion can be achieved over the channel wavelength band. However, in practice this is usually not the case. Some residual dispersion remains, and typically the dispersion curve for the residual dispersion has a negative curvature.

It will be evident from the curve of FIG. 3, that the CDCF fiber described here has a dispersion curve with a positive slope. Since the residual dispersion that is normally being compensated in a typical transmission system has a negative slope, this further adds to the effectiveness of the CDCF of the invention.

The system illustrated in FIG. 1 shows the wideband signal demultiplexed into four individual channels 16-19, with a CDCF module in each channel. As is well known, some systems are designed with two or more stages of demultiplexing, i.e. the main signal is first split into sub-bands, and the sub-bands are demultiplexed into single channels. It will occur to those skilled in the art that the DCF of the invention may be inserted at any place in the system, i.e., before the channel demultiplexer, and/or after.

Figure 4:
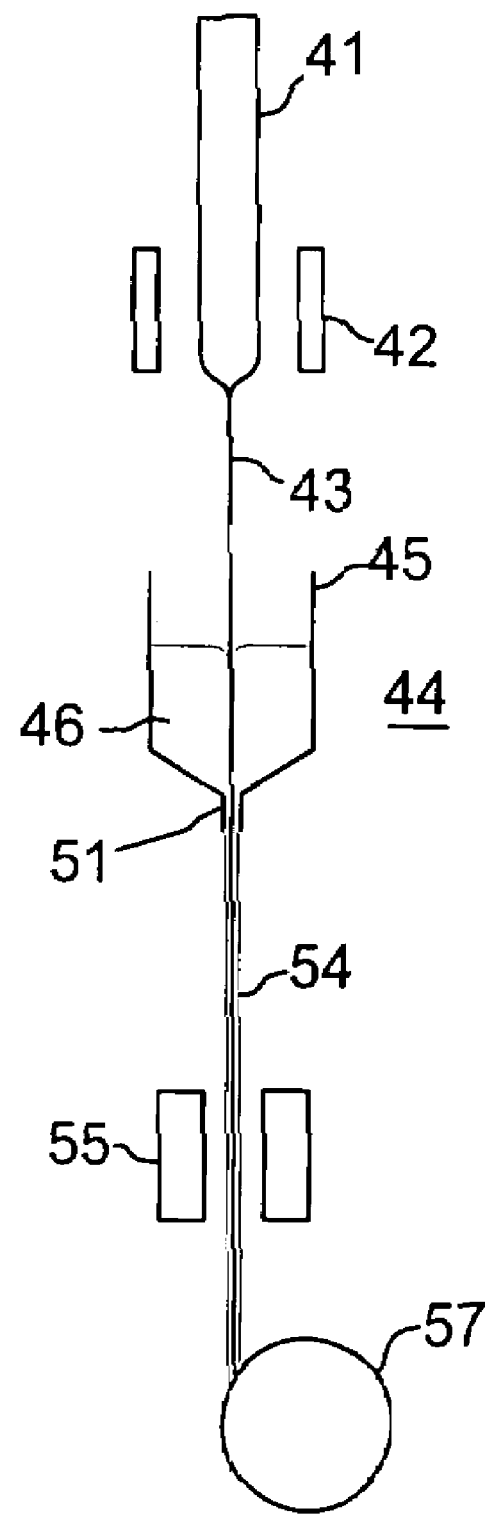
FIG. 4 is a schematic representation of an optical fiber drawing apparatus.

The optical fiber preform, as described above, is then used for drawing optical fiber. FIG. 4 shows an optical fiber drawing apparatus with preform 41, and susceptor 42 representing the furnace (not shown) used to soften the glass preform and initiate fiber draw. The drawn fiber is shown at 43. The nascent fiber surface is then passed through a coating cup, indicated generally at 44, which has chamber 45 containing a coating prepolymer 46. The liquid coated fiber from the coating chamber exits through die 51. The combination of die 51 and the fluid dynamics of the prepolymer controls the coating thickness. The prepolymer coated fiber 54 is then exposed to UV lamps 55 to cure the prepolymer and complete the coating process. Other curing radiation may be used where appropriate. The fiber, with the coating cured, is then taken up by take-up reel 57. The take-up reel controls the draw speed of the fiber. Draw speeds in the range typically of 1-30 m/sec. can be used. It is important that the fiber be centered within the coating cup, and particularly within the exit die 51, to maintain concentricity of the fiber and coating. A commercial apparatus typically has pulleys that control the alignment of the fiber. Hydrodynamic pressure in the die itself aids in centering the fiber. A stepper motor, controlled by a microstep indexer (not shown), controls the take-up reel.

Coating materials for optical fibers are typically urethanes, acrylates, or urethane-acrylates, with a UV photoinitiator added. The apparatus of FIG. 4 is shown with a single coating cup, but dual coating apparatus with dual coating cups are commonly used. In dual coated fibers, typical primary or inner coating materials are soft, low modulus materials such as silicone, hot melt wax, or any of a number of polymer materials having a relatively low modulus. The usual materials for the second or outer coating are high modulus polymers, typically urethanes or acrylics. In commercial practice both materials may be low and high modulus acrylates. The coating thickness typically ranges from 80-300 μm in diameter, with approximately 245 μm standard.

It should be understood that, while the preferred technique for manufacture of preforms is MCVD, the actual method used to achieve the results that form a basis for one aspect of the invention may be selected from a wide variety of choices.

These include, but are not limited to, the use of OVD, VAD, PCVD, POVD, MCVD and combinations thereof; the use of different refractive index profiles to achieve the end properties claimed, and other similar alternatives. These and other additional modifications of this invention will occur to those skilled in the art. All deviations from the specific teachings of this specification that basically rely on the principles and their equivalents through which the art has been advanced are properly considered within the scope of the invention as described and claimed.

The invention claimed is:

1. An optical fiber characterized by:
   (a) dispersion at 1550 nm: more negative than −20 ps/nm-km,
   (b) −0.02 ps/nm$^2$-km<dispersion slope at 1550 nm<0.02 ps/nm$^2$-km, and wherein the normal optical energy confinement region consists essentially of a core, a trench surrounding the core, and a ring surrounding the trench, and further wherein the core has a refractive index variation extending from the center of the core to the trench and that variation exhibits essentially an alpha profile.

2. The optical fiber of claim 1 wherein the dispersion at 1550 nm: <−40 ps/nm-km.

3. The optical fiber of claim 1 wherein:
   −0.01 ps/nm$^2$-km<Dispersion slope at 1550 nm <0.01 ps/nm$^2$-km.

4. The optical fiber of claim 1 wherein the dispersion variation over the wavelength region of 1500 nm to 1620 nm is less than 5 ps/nm-km.

5. The optical fiber of claim 1 wherein the dispersion variation over the wavelength region of 1500 nm to 1620 nm is less than 2 ps/nm-km.

6. The optical fiber of claim 1 further characterized by:
   Cutoff wavelength: <1470 nm
   Polarization Mode Dispersion (PMD): 0.00-0.06 ps/km$^{0.5}$
   Attenuation @ 1550 nm: <0.4 dB/km.

7. The optical fiber of claim 1 additionally including a second trench region outside of the normal optical energy confinement region.

8. The optical fiber of claim 1 wherein:
   (a) the dispersion at 1550 nm is <−40 ps/nm-km,
   (b) the dispersion slope at 1550 nm<0.01 ps/nm$^2$-km, is greater than −0.01 ps/nm$^2$-km and less than 0.01 ps/nm$^2$-km
   (c) the dispersion variation over the wavelength region of 1500 nm to 1620 nm is less than 2 ps/nm-km.

9. The optical fiber of claim 8 wherein the dispersion slope is positive or negative.

10. An optical WDM system comprising:
    a. a length of optical fiber,
    b. light source for introducing light into the optical fiber, the light comprising multiple wavelength division multiplexed (WDM) wavelengths,
    c. demultipler for separating the light into multiple demultiplexed channels,
    d. dispersion compensator in each demultiplexed channel, the dispersion compensator comprising a length of channel dispersion compensating fiber (CDCF), the CDCF comprising an optical fiber characterized by:
       (i) dispersion at 1550 nm: more negative than −20 ps/nm-km,
       (ii) −0.02 ps/nm$^2$-km<dispersion slope at 1550 nm<0.02 ps/nm$^2$-km,
       (iii) dispersion variation over the wavelength region of 1500 nm to 1620 nm: less than 2 ps/nm-km,
    and wherein the normal optical energy confinement region consists essentially of a core, a trench surrounding the core, and a ring surrounding the trench,
    and further wherein the core has a refractive index variation extending from the center of the core to the trench and that variation exhibits essentially an alpha profile.

11. The system of claim 10 wherein the CDCF in each of the demultiplexed channels have essentially the same refractive index profile.

12. The system of claim 11 wherein the CDCF in each of the demultiplexed channels have different lengths.

13. The system of claim 10 wherein the light includes wavelengths above 1510 nm, and includes 1550 nm.

14. The system of claim 10 wherein the multiple wavelength division multiplexed (WDM) wavelengths operate over the C-, L- or extended L- bands.

15. The system of claim 14 wherein the light is a lightwave signal operating at 40 Gb/s.

16. The system of claim 10 wherein the dispersion of the CDCF at 1550 nm: <−40 ps/nm-km.

17. The system of claim 16 wherein the dispersion slope of the CDCF is:
    −0.01 ps/nm$^2$-km<Dispersion slope at 1550 nm<0.01 ps/nm$^2$-km.

18. The system of claim 15 wherein the dispersion variation of the CDCF over the wavelength region of 1500nm to 1620 nm is less than 2 ps/nm-km.

19. The CDCF of the system of claim 10 further characterized by:
    Cutoff wavelength: <1470 nm
    Polarization Mode Dispersion (PMD): 0.00-0.06 ps/km$^{0.5}$
    Attenuation @ 1550 nm: <0.4 dB/km.

20. The system of claim 10 wherein the dispersion slope of the CDCF is positive or negative.

* * * * *